United States Patent [19]

Kimbrough et al.

[11] 4,301,355
[45] Nov. 17, 1981

[54] GAS METAL ARC WELDING SYSTEM

[75] Inventors: Andrew G. Kimbrough, Simi; Ronald R. Rothermel, Valencia; Donald P. Viri, Simi, all of Calif.

[73] Assignee: Dimetrics, Inc., Sepulveda, Calif.

[21] Appl. No.: 175,357

[22] Filed: Aug. 4, 1980

[51] Int. Cl.³ .............................................. B23K 9/09
[52] U.S. Cl. ........................ 219/137 PS; 219/130.33;
219/130.31; 219/130.32; 219/130.51;
219/137.71
[58] Field of Search ................. 219/137 PS, 130.33,
219/130.31, 130.32, 137.71, 130.51

[56] References Cited

U.S. PATENT DOCUMENTS

| | | | |
|---|---|---|---|
| 3,956,610 | 5/1976 | Kanbe et al. | 219/130.51 |
| 4,019,016 | 4/1977 | Friedman et al. | 219/130.51 |
| 4,092,517 | 5/1978 | Woodacre | 219/137 PS |

Primary Examiner—C. C. Shaw
Attorney, Agent, or Firm—Ralph B. Pastoriza

[57] ABSTRACT

Power delivered to the welding arc from a constant current rapid response power supply is controllable to maximize arc stability particularly in out-of-position welding operations. A first control modulates the output current from the power supply between a high value close to the maximum output value and a minimum value just sufficient to maintain the welding arc. The modulation is effected at a given frequency appropriately adjusted in accordance with the electrode material and diameter to maintain optimum spray metal transfer in the welding arc. A further control is effected by pulse width modulating the output from the power supply in accord with a set-in current programmed signal which is compared with a current feedback signal or, alternatively, a set in voltage programmed signal which is compared with a voltage feedback signal. This latter control provides for operation of the power supply in a constant current control mode or alternatively, a constant voltage control mode. Still further control of the power in the welding arc is effected by pulsing the current between base and peak levels at a relatively low frequency which enables control of the weld puddle in out-of-weld positions.

18 Claims, 11 Drawing Figures

SPRAY TRANSFER
FIG.1.

DROPLET TRANSFER
FIG.2.

DROPLET TRANSFER
FIG.3.

SHORT CIRCUIT ARC
FIG.4.

SHORT CIRCUIT ARC
FIG.5.

SHORT ARC
FIG.6.

GAS METAL ARC WELDING SYSTEM

This invention relates generally to welding operations and more particularly to an improved gas metal arc welding system incorporating a solid state or transistorized power supply.

BACKGROUND OF THE INVENTION

In gas metal arc welding processes, there is provided a feed wire electrode. An electrical arc is struck between this electrode and the work to be welded and normally an inert gas is provided within an appropriate shroud in the arc environment. There may be traces of chemically active gases in this inert gas.

The feed wire electrode is continuously fed towards the work and is consumed by melting under the intense heat of the arc, the metal of this electrode thus depositing on base material and in forming the weld.

With respect to the foregoing, a most desirable type of metal transfer mode is known in the art as "spray transfer." In this type of transfer, the current density and resultant high coaxial magnetic field in combination with a pressure, voltage gradient between electrode tip (wire) and base metal, results in molten metal particles being ejected from the end of the feed wire as it is being continuously fed towards the work. These particles are transferred across the arc and impinge on a molten puddle which is formed in the work. Unless this puddle is properly controlled, it can become sufficiently large that it is not possible to maintain a spray transfer mode for out-of-position welding applications; for example, in welding about the circumference of a pipe wherein the gravitational components causes undue flowing of the weld puddle.

If the curent density is reduced, there is reached a value which is not sufficient to expel the metal from the end of the feed wire and the metal will be melted and form a droplet. The droplet itself increases in size until its mass causes it to break loose and fall toward the puddle. Impacting of the puddle by the drop will splash molten metal around the weld zone. Such turbulent action can result in cold lapping, excessive spatter accumulation on the torch and surrounding work and a poor quality weld.

If still less current density is utilized, the feed wire electrode will move towards the molten puddle faster than droplets can be formed. As a consequence, no metal transfer takes place until physical contact is made between the droplet starting to form on the end of the feed wire and the puddle. At this point, a short circuit is established extinguishing the arc and a massive current surge is initiated by the normally provided constant voltage power supply. Within a short time, the feed wire is fused until it becomes molten.

The foregoing fusing action re-establishes the arc and the current returns to its original low power level which reinitiates the entire process. This action can occur at frequencies of up to 200 Hz. The action is known in the art as a short circuiting arc process. Because the molten puddle under this short circuiting arc process is smaller, it is capable of useful operation in out-of-position welding. On the other hand, the deposition rates are low for the short circuiting process and in general poor weld quality due to porosity and cold lapping often result.

Some of the foregoing difficulties have been overcome with the advent of semi-conductor technology by utilizing what is known as a pulsed spray transfer mode for out-of-position welding. Essentially, the power supply output was pulsed at a frequency of either 60 or 120 Hz. Under these conditions, the power supply would output a DC base power level adjusted to a value just sufficient to keep the arc ignited. Then at 60 or 120 times per second a very high power level pulse would be superimposed on the base level. The high current density produced by this pulse would eject metal particles in a spray transfer mode. When the pulse was removed, the metal transfer was terminated and a lower power arc would be maintained until the next pulse.

The foregoing arrangement essentially permitted some puddle control by alternate cooling so that out-of-position welding could be achieved. Further, many of the deficiencies characteristic of the short circuiting arc process were overcome although there still resulted a relatively low deposition rate.

The basic problem in all instances is that of arc stability. If there were some means of providing for a stabilized arc, then various further control processes could readily be carried out, all to the end that puddle control and deposition rates on a work in out-of-position welding could be maximized.

BRIEF DESCRIPTION OF THE PRESENT INVENTION

With the foregoing considerations in mind, the present invention contemplates a greatly improved gas metal arc welding control system wherein arc stability is achieved to a sufficient extent that appropriate puddle control and deposition rate on a work in out-of-position welding for a given power level and a given feed wire electrode material of given diameter can be maximized far beyond that possible in any prior art gas metal arc welding system of which we are aware.

Briefly, and in its broadest aspect, the method of the present invention for effecting the foreoging maximization includes a combination of the following steps:

First, power is passed from a constant current rapid response power supply to the feed wire electrode. Current and voltage feedback signals corresponding respectively to the value of the current and voltage of the welding arc are provided. The power from the power supply is then modulated by a current reference control signal at a given frequency and given amplitude to provide a current varying between a relatively high output current of the power supply and a relatively low output current. A pulse width modulator control signal corresponding to the amplified difference between the current feedback signal and a set-in current programmed signal is utilized to control the pulse width of the current reference control signal to provide essentially a constant current control mode of the power supply. In this mode, the rate of feed of the feed wire material is controlled in accordance with a signal corresponding to the amplitude difference between the voltage feedback signal and a set-in voltage programmed signal.

In a preferred embodiment of the invention, the method also includes the steps of providing an additional pulse width modulator control signal corresponding to the amplified difference between the voltage feedback signal and the heretofore referred to voltage programmed signal. This additional pulse width modulator control signal can be selected at the operator's option to control the pulse width of the current reference control signal and thereby provide a constant voltage control mode of the power supply. When this additional pulse width modulator control signal is selected, the rate of feed of the feed wire material is maintained constant.

A further feature permits the selected modulator control signal to be pulsed at a low frequency relative to the given frequency between peak and base values to thereby alternately "melt" and "chill" the work. This low frequency is adjustable to provide for optimum root penetration and puddle control by this alternate "melting" and "chilling" particularly in out-of position welding.

BRIEF DESCRIPTION OF THE DRAWINGS

A better understanding of the foregoing method together with suitable apparatus for carrying out the method of the present invention will be had by now referring to the accompanying drawings in which.

DETAILED DESCRIPTION OF THE PREFERRED EMBODIMENT

Figure 1:
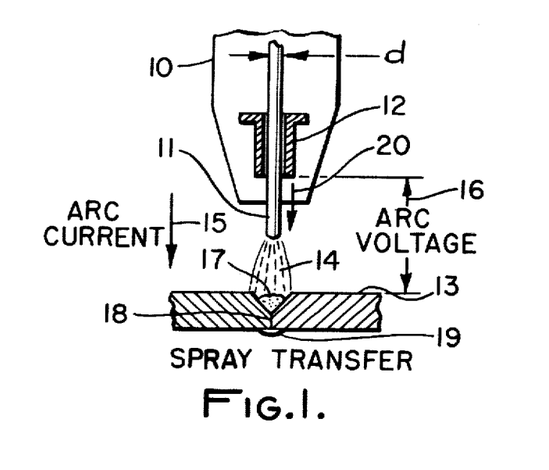
FIGS. 1 through 6 are schematic diagrams illustrating various metal transfer modes in a gas metal arc welding system useful as background information in understanding the present invention.

Referring first to FIG. 1, there is schematically depicted at 10 a welding head with a feed wire material 11 of given diameter d. A contact tube or other current transfer device such as a brush 12 surrounds the feed wire 11 and, as will become clearer as the description proceeds, provides for electrical continuity from an appropriate power supply. In the gas metal arc welding process, the feed wire 11 serves as an electrode and is consumed during the welding operation.

Shown below the welding head 10 is a work 13 which, for the sake of illustration, may constitute pipe ends to be welded together. In this respect, the abutting pipe ends are bevelled to form an exterior V within which the welding takes place.

A weld arc is struck between the tip of the electrode 11 and the work 13 as schematically indicated at 14. This arc is characterized by an arc current indicated by the arrow 15 and an arc voltage indicated by the arrows 16 which is measured between the lower end of the contact tube 12 and the surface of the work 13.

The arc itself has a plasma portion and as schematically indicated small metal particles are ejected from the tip of the electrode 11 to form a puddle 17 of molten metal within the V of the work.

In the schematic illustration of FIG. 1, the welding would progress about the abutting ends of the pipes so that the head would be moving into the plane of the paper and circumferentially about the pipe ends. It can be appreciated that where the pipes are held stationary and the entire welding head caused to circumferentially pass about the abutting ends, if the puddle 17 becomes too large, it will tend to flow or become unstable in out-of-position situations as when the welding head is moved over to a side or is actually beneath the pipe.

Still referring to FIG. 1, there is indicated at 18 the root of the work to be welded and in a proper welding of the pipe ends together, this root is penetrated and there actually results a small weld bead indicated at 19 about the inner circumference of the abutting ends of the pipe.

It will be appreciated that higher penetration during the welding is achieved if the current is increased; that is, if increased power is supplied in the welding arc. In fact, too much power can result in too much penetration which results in an entire burning through of the abutting ends leaving a void, the puddle simply dropping into the interior of the pipe. Too little power in the arc would not result in enough fusion or penetration so that a weak area of the weld can result. There is thus not only involved problems with puddle control but also problems associated with appropriate root penetration and proper weld quality. In addition, the manner in which the feed wire material 11 is advanced towards the work is important depending upon the particular welding mode utilized. This advancing of the feed wire is indicated by the arrow 20 and as will also become clearer as the description proceeds, is variable under a constant current control mode of operation and fixed under a constant voltage control mode of operation.

Figure 2:
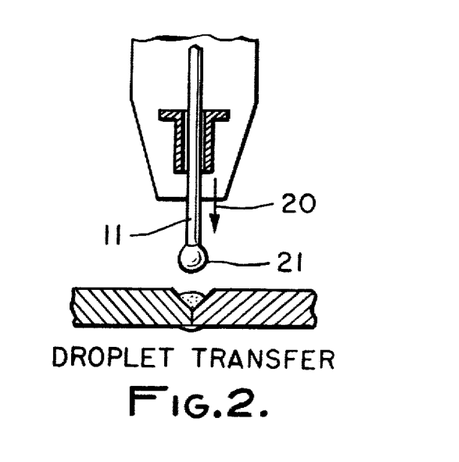

Referring to FIG. 2, there is depicted a transition zone wherein the current density in the spray transfer mode of FIG. 1 has been decreased sufficiently that the metal is no longer ejected in a spray but rather simply tends to accumulate as a drop 21 on the end of the electrode 11. This drop increases in size as the electrode 11 advances towards the work.

Figure 3:
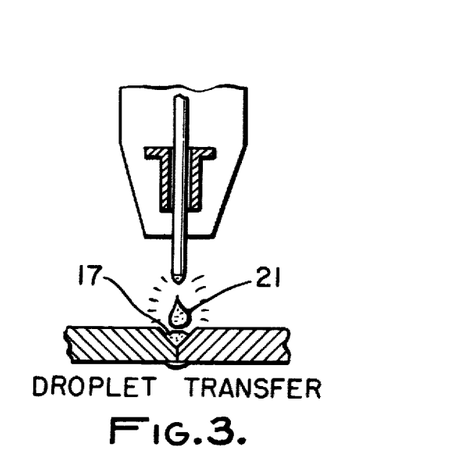

FIG. 3 depicts the situation where the drop 21 has attained a sufficient size that it drops by gravity free of the end of the electrode onto the puddle 17 in the work. The result is a splashing of the molten metal and, as mentioned heretofore, a poor quality weld generally results. As a consequence, the droplet transfer mode is to be avoided if possible.

Figure 4:
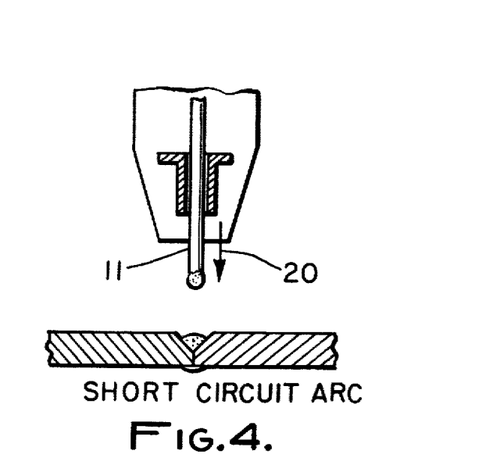
Figure 5:
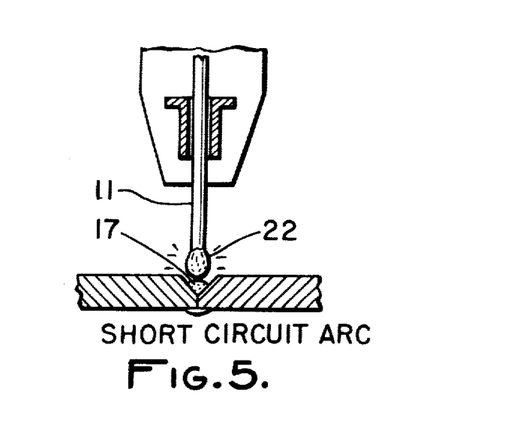
Figure 6:
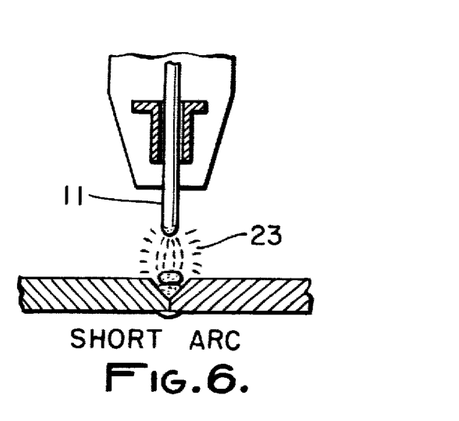

FIGS. 4, 5, and 6 successively depict a short arc transfer mode wherein the current density is decreased still further such that any droplet tending to form on the end of the feed wire 11 cannot achieve a sufficient size to separate before the feed wire itself contacts the puddle 17.

FIG. 4 shows the initiation of the droplet on the end of the electrode 11 whereas FIG. 5 illustrates the enlarged droplet at 22 as it just makes contact with the puddle 17. At this contact point, as also previously mentioned heretofore, a surge of current takes place because of the short circuiting and the resultant current will melt or vaporize the metal momentarily and thus re-establish an arc as indicated in FIG. 6 at 23.

This "short arc" transfer mode results in a fairly small and manageable puddle 17 and thus can be effectively utilized in out-of-position welding. On the other hand, and as also mentioned heretofore, the deposition rate is relatively slow.

From the foregoing description of FIGS. 1 through 6 it can be understood that if the current and/or voltage can be properly controlled at the arc, optimum metal transfer can be achieved to realize maximum deposition rate without the consequent disadvantages of loss of the arc or of droplet formation with its attendant disadvantages. Further, such control, if effective, can greatly facilitate rapid metal deposition in out-of-position welding operatons with assurance that high quality welds will result.

The present invention, as stated, provides for a control of the welding power to the weld head in such a manner as to provide for an exceptionally stable arc. As a consequence, various further controls can be superimposed to maximize the necessary puddle control and deposition rate on a work particularly in out-of-position welding operations.

Figure 7:
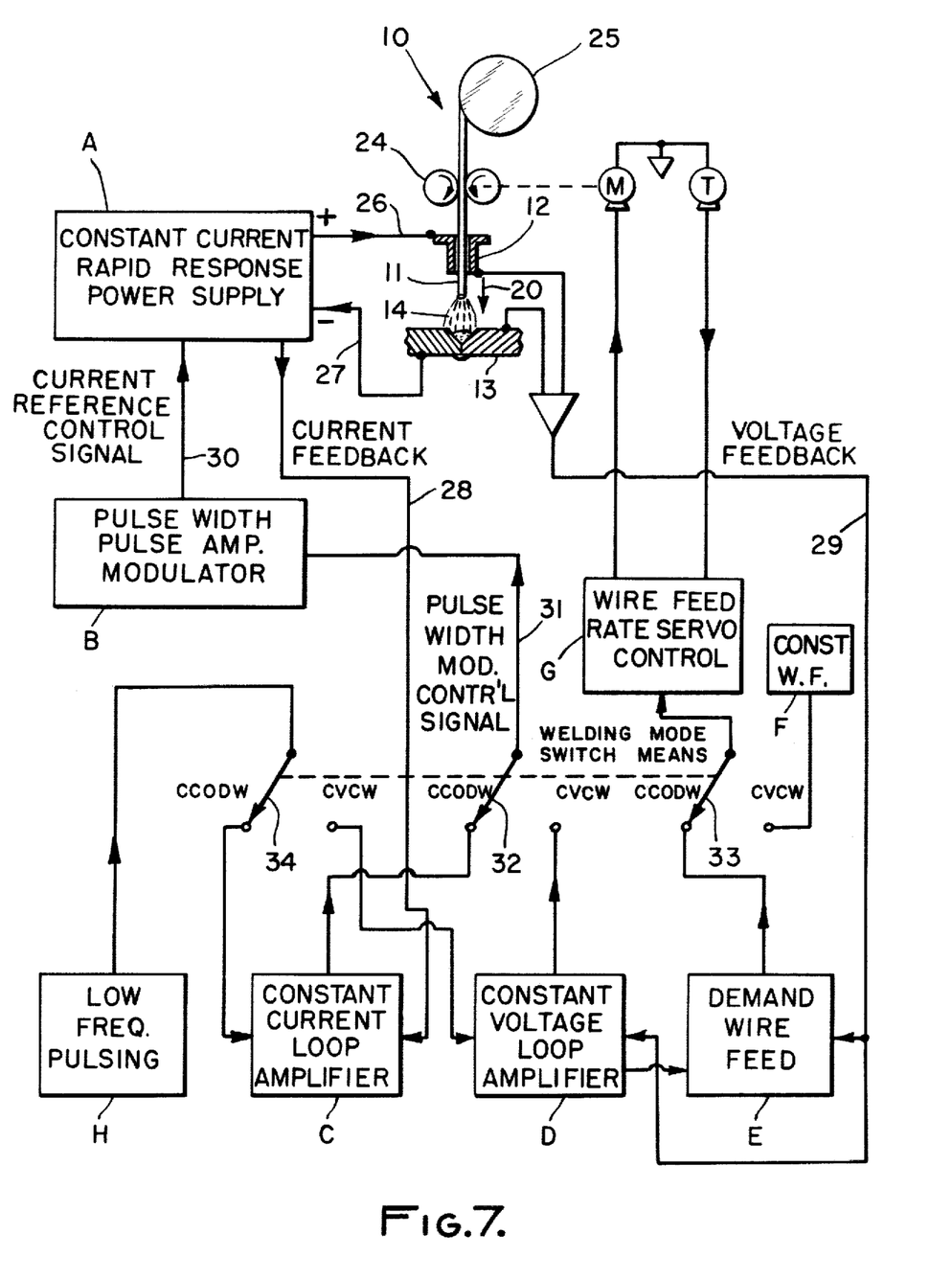
FIG. 7 is a block diagram partly schematic of the basic components making up apparatus for carrying out the method of the present invention.

Referring now to FIG. 7 there is shown a basic block diagram of gas arc welding apparatus for providing the aforementioned controls. In FIG. 7, the arc welding head, electrode material, work, arc and contact tube are all designated by the same numerals used in FIGS. 1 through 6. Movement of the electrode material 11 through the contact tube 12 is accomplished by appropriate feed rollers indicated at 24, the material itself being provided from a supply reel 25.

The arc welding system itself includes a constant current rapid response power supply designated by the block A for passing power along power leads 26 and 27 to establish the welding arc 14. Current and voltage feedback signals corresponding to the value of the current and voltage at the welding arc 14, respectively, are provided on leads 28 and 29.

A first controlling of the power transfer from the constant current rapid response power supply A is effected by a current reference control signal controllable both in frequency, amplitude and pulse width from block B on output line 30. As will become clearer as the description proceeds, this current reference control signal modulates the power to provide a current varying between a relatively high output current of the power supply and relatively low output current. The high output current is made to correspond to a value just under the maximum output current for the power supply and the low output current is adjusted to be just sufficient to maintain the welding arc so that metal spray transfer characteristics are maintained for effective deposition in out-of-position welding. In other words, by so modulating the current, there is provided a pulsed spray transfer mode as has been done heretofore but wherein the effective amplitude and pulse width can be automatically controlled to optimize and maintain spray transfer characteristics. Equally important is the fact that the frequency of this current reference control signal is not confined to 60 or 120 Hertz but rather can be finely tuned to values ranging all the way from 40 Hz. to 999 Hz., thereby enabling a "tuning" suitable for a particular welding operation involving a particular wire feed material of a particular given diameter.

Still referring to FIG. 7, the current reference control signal provided from the block B is controlled in pulse width by a pulse width modulator control signal on lead 31. This pulse width modulator control signal is derived from block C through a switch arm 32. Block C constitutes a constant current loop amplifier and incorporates a means for setting in a current programmed signal constituting one of the welding parameters. Also received by the block C is the current feedback signal on lead 28.

The pulse width modulator control signal on lead 31 when the switch arm 32 is in the position shown corresponds to the amplified difference between the current feedback signal and the current programmed signal.

Switch arm 32 constitutes one of three ganged switches, the other two being indicated at 33 and 34 and the ganged switches themselves being referred to as a WELDING MODE SWITCH MEANS. In the solid line position of the switch arms, they fall on terminals indicated by the letters CCODW (Constant Current On Demand Wire Feed). In this position wherein the block C provides the referred to pulse width modulator control signal, the power supply is operating in a constant current control mode.

The alternate position for the switch arms 32, 33 and 34 is designated by the letters CVCW (Constant Voltage Constant Wire Feed). In this latter position of the switch arms, the pulse width modulator control signal on the lead 31 is derived from block D. Block D constitutes a constant voltage loop amplifier and incorporates a means for setting in a voltage programmed signal constituting one of the welding parameters. Also received in the block D is the voltage feedback signal on lead 29.

When the switch arm 32 is thrown to the CVCW terminal, the pulse width modulator control signal on lead 31 corresponds to the amplified difference between the voltage feedback signal and the voltage programmed signal.

Switch arm 33 serves to control the rate of feed of the feed wire material in a manner depending upon its particular position. In the constant current on demand wire feed position of the switch arm as shown in solid lines, the wire feed rate is controlled by block E. Block E provides a signal constituting the difference between the voltage programmed signal from block D and the voltage feedback signal on lead 29.

When the switch arms 32 and 33 are thrown to the CVCW positions to provide the constant voltage mode of operation, the switch arm 33 provides a signal from the block F resulting in a constant wire feed rate. In this respect, either the signal from the block E or the signal from the block F, depending upon the position of the switch arm 33 passes to a wire feed rate servo control designated by the block G which functions to control the speed of the drive motor indicated at M for the feed rollers 24. A feedback signal from a tachometer T is received in the block G as indicated.

The third switch arm 34 heretofore referred to in the welding mode switch means enables the selected modulator control signal to be pulsed at a low frequency relative to the given frequency. This low frequency pulsing is provided by the block H to the constant current loop amplifier block C when the switch arm 34 is in the constant current on demand wire feed position shown, or to the constant voltage loop amplifier block D when the switch arm 34 is in the constant voltage constant wire feed control terminal. Depending on the position of switch arm 34, the low frequency pulse signal from block H is either summed with the current programmed signal to form a composite current programmed signal or it is summed with the voltage programmed signal to form a composite voltage programmed signal. Therefore, the pulse width modulator control signal on lead 31 corresponds to either the amplified difference between the composite current programmed signal and the current feedback signal or the amplified difference between the composite voltage programmed signal and the voltage feedback signal. As a result, either the arc current or the arc voltage is pulsed between Peak and Base values to thereby alternately effect melting and chilling of the work by the welding arc.

As will become clearer as the description proceeds, this low frequency is adjustable to provide optimum root penetration and puddle control for out-of-position welding and can also be synchronized with either the travel speed of the welding head to assure that successive weld "melts" are consistently spaced at equal distances, generally overlapping slightly, or the position of a torch oscillator in manner similar to that described in U.S. Pat. No. 4,019,016.

From all of the foregoing, it will be clear that the welding operator is provided an option by means of the welding mode switch means to select a pulse width modulator control signal providing either constant current control mode or constant voltage control mode of operation of the power supply, the rate of feed of the feed wire material automatically being controlled depending upon the particular selection. Further, whether the pulse width modulator control signal is derived from the constant current loop amplifier C or the constant voltage loop amplifier D, in either position, the low frequency pulsing control from block H is automatically provided if desired.

Figure 8:
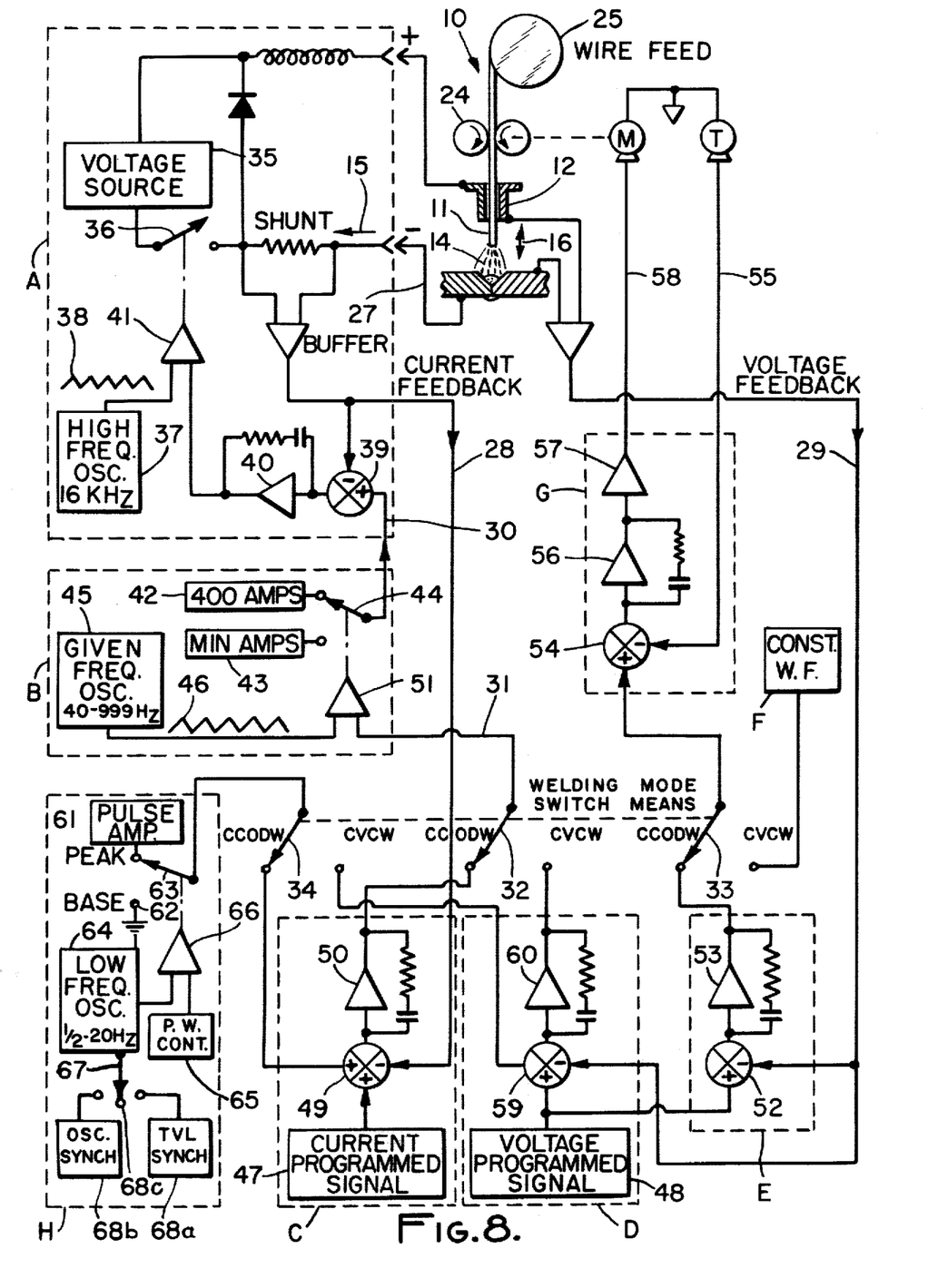
FIG. 8 is a more detailed block diagram also partly schematic of the various components in the blocks of FIG. 7.

Referring now to FIG. 8, the various components within each of the blocks described in FIG. 7 are outlined in dashed line shaped blocks and are designated by the same letters. Also, the same numerals are used for the same elements already described.

In a preferred embodiment of this invention, the constant current rapid response power supply described in FIG. 7 as block A is shown in FIG. 8 as including an unregulated voltage source 35 from which power is passed to the welding head through a solid state switch schematically indicated at 36. Switch 36 is arranged to be opened and closed at a high frequency relative to the heretofore referred to given frequency for the current reference control signal on line 30 described in FIG. 7. This high frequency may be, for example, 16 KHz and the oscillator itself is indicated by the block 37 providing a generally triangular output 38.

The current feedback signal provided on lead 28 is derived as indicated in FIG. 8 by a shunt and buffer amplifier. A means in the form of a summing circuit 39 and amplifier 40 is responsive to the difference between the heretofore referred to current reference control signal on lead 30 and the current feedback signal from the buffer amplifier to provide a signal level determined by this difference. A comparator 41 receiving the output from the oscillator 37 is responsive to this signal level for controlling the length of time that the solid state switch 36 is closed for each period of the high frequency to thereby control the arc current. This type of pulse width modulation for the current supplied to the welding head at a high frequency as described provides for the desired extremely rapid response of the power supply to current changes produced by disturbances within the arc. In other words, any sudden change in current as reflected in the current feedback signal to the summing circuit 39 as compared to the current reference control signal received in this summing circuit will be reflected in a signal level which will change the duty cycle of the switch 36 in a manner to change the pulse width or time period that the switch 36 is closed and compensate for this change. The changed current signal will then be fed back to the summing circuit 39 and proper current regulation will obtain through the feedback loop.

Shown below the block A in FIG. 8 are the components in the block B for providing the described current reference control signal on the lead 30.

The block 42 normally represents close to the maximum output of the power supply and wherein it is stated that this high current output corresponds to the maximum output of the power supply, such language is meant to include any output current figures slightly less than the actual maximum output of the power supply. The block 43 indicating a low output current from the power supply, in turn, is an adjustable input parameter of the welding system and as stated, is appropriately adjusted such that the current even though small is sufficient to maintain the welding arc.

The given frequency of the oscillator block 45, as stated in conjunction with FIG. 7, is also adjustable to meet conditions of a specific welding operation and a specific wire feed material of given diameter; in other words, it serves to enable a "tuning" of the particular welding operation for optimum weld quality. This given frequency as indicated may vary by way of example 40 to 999 Hz.

As schematically indicated in the block B, the output from this oscillator is triangular as indicated at 46 and is compared with a pulse width modulator control signal on lead 31 from the block C when the switch arm 32 is in the CCODW position shown.

Referring to the lower portion of FIG. 8, the current programmed signal provided in block C is indicated at 47 while the voltage programmed signal provided in block D is indicated at 48. As mentioned, each of these signals is a welding input parameter.

Considering the block C, this current programmed signal is summed with the current feedback signal on lead 28 in a summing circuit 49 to provide a difference signal to amplifier 50 and then to lead 31 by way of the switch arm 32. This particular signal level is compared with the triangular wave form 46 in the comparator 51 to thereby operate the switch 44 and hold it for a given length of time in the 400 amp position during each period, depending upon the level of the signal on lead 31. In other words, a duty cycle control is provided the same as described for the rapid response power supply control switch 36 in conjunction with oscillator 37. However, the given frequency is substantially lower than the high frequency oscillator in the constant current power supply.

Referring once again to the lower portion of FIG. 8, it will be noted that the voltage programmed signal from block 48 is passed by branch lead to a summing circuit 52 receiving a voltage feedback signal on the lead 29. The difference between these two signals is amplified in amplifier 53 and applied through switch arm 33 which is in the CCODW position to the wire feed servo in block G. This servo includes a summing circuit 54 providing a difference signal between the signal from block E and a tachometer feedback signal on lead 55 from the motor tachometer T from the wire roller drive motor M. The difference signal is amplified in amplifier 56 and also in amplifier 57 to provide sufficient power to operate the motor M by way of lead 58 and thereby control the feed rollers 24. The rate of wire feed for the electrodes material 11 is thus automatically controlled by the demand wire feed block E and wire servo block G.

When the switch arms 32 and 33 are thrown to the CVCW terminals, the wire feed is maintained constant by a constant wire feed control F which provides a fixed signal to the wire servo block G through the switch arm 33. Also, the pulse width modulator control signal on lead 31 is now derived from the block D. This signal constitutes the amplified difference between the voltage programmed signal from block 48 and a voltage feedback signal from the lead 29 as provided by summing circuit 59 and amplifier 60.

As described in conjunction with the basic block diagram of FIG. 7, when the switch arms 32 and 33 are in the CVCW terminal positions, then the power supply is operating as a constant voltage control mode whereas when the switch arms are in the CCODW positions shown in solid lines, the power supply is operating in a constant current control mode. Either mode of operation can be selected by the welding mode switch means described.

Considering now the low frequency pulsing block H described in FIG. 7, this block can include, as indicated in FIG. 8, a pulse amplitude control 61 which can be adjusted to provide for a Peak value of the pulse compared to a Base value. Depending on the position of the Welding Mode Switch, the Peak value is either formed by 49 by the summation of the pulse amplitude signal from block 61 and the current programmed signal from block 47 or it is formed at 59 by the summation of the pulse amplitude signal from block 61 and the voltage programmed signal from block 48. Similarly, the Base value is formed by the summation of a zero or ground level indicated at 62 with either the current programmed signal or the voltage programmed signal. Therefore, the Base level is simply equal to either the current programmed signal or the voltage programmed signal. A switch arm 63 is actuated to move between Peak and Base positions at the desired low frequency oscillation which may vary by way of example between one half to 20 Hz. under control of oscillator 64. Not only is the pulse amplitude adjustable as by block 61, but also the duty cycle of the pulse or the pulse width can be adjusted as by block 65 providing an appropriate level for cooperation with the triangular output from the low frequency oscillator 64 passing into the comparator 66 for switch arm 63. When it is desired to synchronize the low frequency pulsing to the travel rate of the welding head as described heretofore, a switch 67 can be thrown to synchronize the output frequency of the low frequency oscillator with the travel rate indicated by block 68. Or when synchronization of low frequency pulsing to oscillator position is desired, switch 67 can be thrown to the osc. synch. position. An actual method of oscillator synch. is presented in U.S. Pat. No. 4,019,016.

Figure 9:
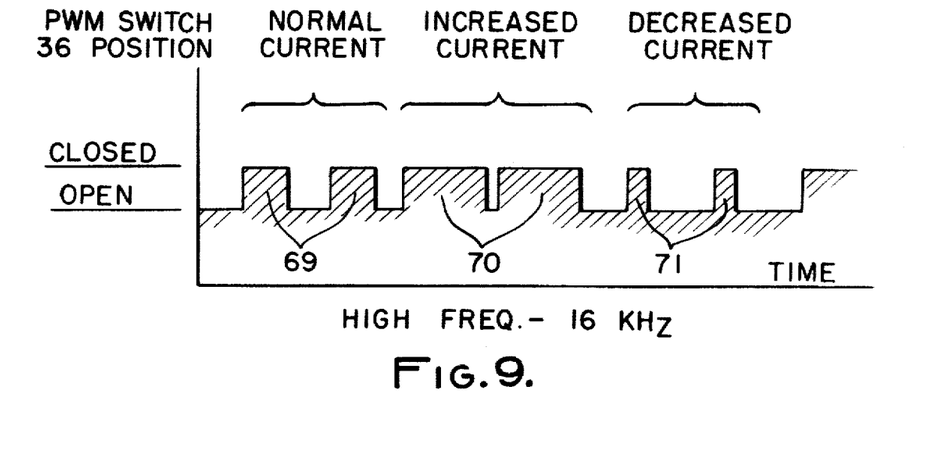
FIG. 9 is a diagram illustrating pulse width modulation by the opening and closing of a solid state transistor switch utilized in the power supply as an example of one means for delivering controlled power to the welding head.
Figure 10:
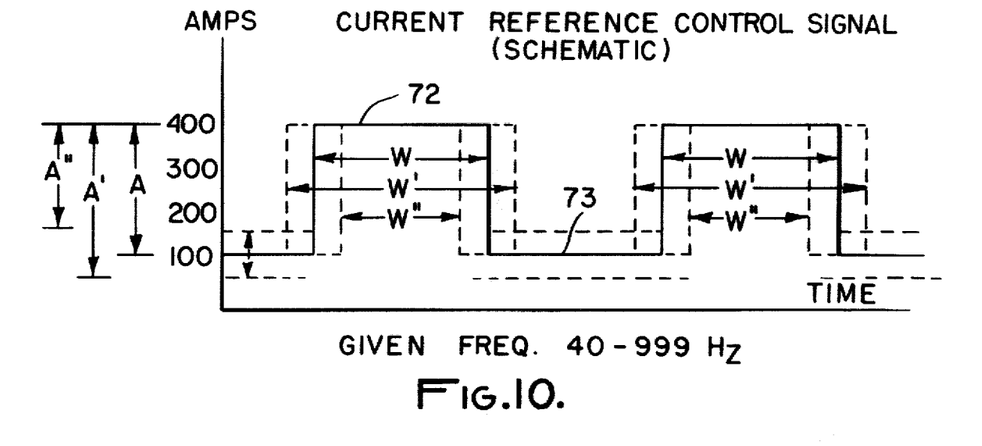
FIG. 10 is a schematic waveform illustrating the current reference control signal utilized as a first control of the power passed to the welding head; and, FIG. 11 is another waveform depicting a low pulsing frequency control of the welding power.
Figure 11:
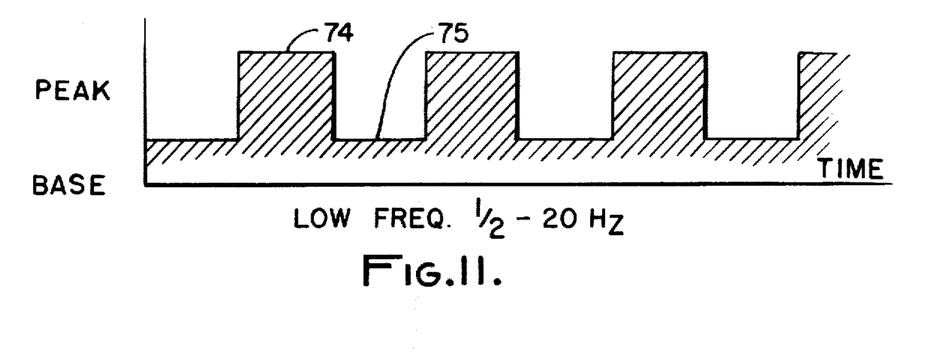

All of the foregoing described circuits and operations can be easily summarized by now referring to the diagrams of FIGS. 9, 10 and 11.

FIG. 9 schematically indicates the duty cycle or opening and closing of the transistor switch 36 in the rapid response power supply in block A. As mentioned, this opening and closing occurs at a high frequency of, for example, 16 KHz. The pulses 69 represent, by way of example, normal current. When the current is to be increased, the pulse is increased in width as indicated at 70 whereas when the current is to be decreased, the pulse is decreased in width as indicated at 71.

FIG. 10 schematically illustrates the current reference control signal utilized to control the passing of the current in the power supply shown in FIG. 9 into the welding head. The referred to pulsing of this current between a high output value; for example, 400 amps. and a low current output corresponding to a current sufficient to maintain the arc is indicated respectively at 72 and 73. The frequency itself as stated is adjustable between 40 and 999 Hz. The amplitude is in turn adjustable by a set in lower minimum amps. level as indicated by the amplitude arrows A, A' and A".

Finally, the pulse width modulation of the current reference control signal by the outer current or voltage control loop amplifiers provided by blocks C and D, in turn, is indicated by the dotted lines in FIG. 10. Thus, a normal width of the pulse is indicated at W whereas an increased pulse width to result in increased current is indicated at W' and a decreased pulse width to decrease the current is indicated at W".

Finally, the optional addition of a low pulsing frequency as provided by the block H as described in FIGS. 7 and 8 is schematically depicted in FIG. 11 wherein the low frequency pulses take place between peak and base values indicated at 74 and 75. By alternating between a power level, which would be excessive on a continuous basis, and a lower power level, the size of the weld puddle can be expanded to a point where it would start to sag, and then retracted as it cools down with the lower power level. The action thus provides the ability to maximize deposition rates while maintaining high quality in all positions of welding.

It should be emphasized that the process stability achieved by the wide control available for the current reference control signal described in FIG. 10, permits the utilization of the low frequency pulsing described.

From all of the foregoing, the unique advantages and features of this invention can be summarized as follows:

1. By setting the high output current of the modulation by the current reference control signal at the maximum power supply current output, each high output current pulse produces a high density spray transfer for the duration of that pulse. The low current output or minimum amps. parameter is adjusted, as stated, for the lower setting which will reliably sustain the arc between modulation pulses. These adjustments provide the ability to maintain spray transfer characteristics as 20-30% lower power levels for equivalent deposition rates than could be attained with conventional systems.

2. Because the modulation frequency; that is, the given frequency of the current reference control signal is adjustable as a weld parameter, the process stability can be enhanced by "tuning" this modulation frequency for a given type of welding operation, given electrode material and diameter.

3. The process stability achieved, as stated, permits the use of the low frequency pulsing functions for weld puddle control so that maximum deposition rates can be achieved with visual and metallurgical high quality welds in all welding positions.

In the preferred embodiment of this invention as described, there is a uniqueness in the use of three distinct superimposed pulse width modulation frequencies, to wit:

1. A 16 KHz. pulse width modulation frequency used for the rapid response power supply current regulation.

2. A 40-999 Hz. pulse width modulation frequency to "tune" and stabilize the transfer characteristics to match the welding operation, electrode diameter and composition.

3. A ½ to 20 Hz. pulse width modulation pulsing frequency to achieve out-of-position puddle control.

The combination of all of the foregoing factors in an integrated automatic welding system provides an extremely wide range of spray transfer performance, from very low power input welds to very high deposition rate out-of-position welds with the common denominators of excellent quality welds with minimum splatter, process repeatability and arc stability.

We claim:

1. A method for maximizing weld arc stability, puddle control and deposition rate on a work especially in but not limited to out-of-position welding for a given power level and given feed wire electrode material of given diameter, including the steps of:

(a) passing power from a constant current rapid response power supply to the feed wire electrode;
   (b) providing a current feedback signal corresponding to the value of the current at the welding arc;
   (c) providing a voltage feedback signal corresponding to the value of the voltage at the welding arc;
   (d) providing a current reference control signal at a given frequency and given amplitude to modulate the power to provide a current varying between a relatively high output current of the power supply and relatively low output current;
   (e) providing a pulse width modulator control signal corresponding to the amplified difference between said current feedback signal and a current programmed signal;
   (f) controlling the pulse width of said current reference control signal with said pulse width modulator control signal to provide a constant current control mode of the power supply; and
   (g) controlling the rate of feed of said feed wire material in accordance with a signal corresponding to the amplitude difference between said voltage feedback signal and a voltage programmed signal.

2. The method of claim 1, including the steps of providing an additional pulse width modulator control signal corresponding to the amplified difference between said voltage feedback signal and said voltage programmed signal; providing the option to select said additional pulse width modulator control signal to control the pulse width of said current reference control signal to provide a constant voltage control mode of the power supply; and maintaining the rate of feed of said feed wire material constant whenever said additional pulse width modulator control signal is selected.

3. The method of claim 1, in which said power is passed from said constant current rapid response power supply by closing and opening a solid state switch between said power supply and wire feed electrode at a high frequency relative to said given frequency; and controlling the width of the resulting power pulses passed to said electrodes by a signal level corresponding to the difference between said current reference control signal and current feedback signal.

4. The method of claim 1, in which said relatively high output current of the power supply corresponds to the maximum output current for said supply and said low output current is adjusted to be just sufficient to maintain said arc so that metal spray transfer characteristics are maintained for effective deposition in out-of-position welding, and in which said given frequency is adjustable to a value to provide for maximum arc stability for said given power level and wire feed electrode material of given diameter.

5. The method of claim 2, including the additional step of pulsing the selected modulator control signal at a low frequency relative to said given frequency between values corresponding to peak and base values to thereby alternately melt and chill the work, which low frequency and pulse width are adjustable to provide optimum root penetration and/or puddle control especially for said out-of-position welding.

6. The method of claim 5, including the step of synchronizing said low frequency and the travel speed of the welding arc relative to the work to provide for constant spacing between successive melt pulse welds along the direction of travel.

7. A gas metal arc welding control system for maximizing weld arc stability between the arc head and work, puddle control in the work and deposition rate especially in out-of-position welding for a given power level and a given feed wire electrode material of given diameter, including in combination:

(a) a constant current rapid response power supply for passing power to the weld head to provide a welding arc;
   (b) an arc current responsive means to provide a current feedback signal;
   (c) an arc voltage responsive means to provide a voltage feedback signal;
   (d) a pulse width pulse amplitude modulator for generating a current reference control signal for said constant current rapid response power supply to modulate the current between a high output current and a low output current from said power supply at a given frequency;
   (e) means for providing a current programmed signal;
   (f) means for providing a voltage programmed signal;
   (g) means for generating a pulse width modulator control signal for pulse width modulating said current reference control signal as a function of the amplified difference between said current programmed signal and said current feedback signal to thereby provide a constant current control mode of said power supply; and
   (h) demand means for controlling the rate of feeding of said feed wire electrode material in accordance with a signal corresponding to the amplified difference between said voltage feedback signal and said voltage programmed signal.

8. A control system according to claim 7, including means for generating an additional pulse width modulator control signal for pulse width modulating said current reference control signal as a function of the amplified difference between said voltage programmed signal and said voltage feedback signal; constant means for fixing the rate of feeding of said feed wire electrode material to a constant value; and welding mode switch means for substituting said additional pulse width modulator control signal for the first mentioned pulse width modulator control signal and simultaneously substituting said constant means for said demand means to thereby provide a constant voltage control mode of said power supply.

9. A control system according to claim 7, in which said constant current rapid response power supply includes a solid state switch for passing power to said welding head; an oscillator for opening and closing said switch at a high frequency relative to said given frequency; means responsive to the difference between said current reference control signal and said current feedback signal for providing a signal level determined by said difference; and means responsive to said signal level for controlling the length of time said solid state switch is closed for each period of said high frequency to thereby control said arc current.

10. A control system according to claim 7, in which said high output current corresponds to the maximum output of said power supply; means for adjusting said low output current to a value just sufficient to maintain the welding arc to thereby maintain metal spray transfer characteristics in said arc for out-of-position welding; and means for adjusting said given frequency to provide for maximum arc stability for said given power level and wire feed electrode material of given diameter.

11. A control system according to claim 8, including a pulsing means operating at a low frequency relative to said given frequency, said welding mode switch means including means for applying said pulsing means to modulate said first mentioned pulse width modulator control signal when in said constant current control mode and to modulate said additional pulse width modulator control signal when in said constant voltage control mode, said low frequency pulsing modulating the pulse width modulator control signal between peak and base values to thereby alternately melt and chill the work; and means for adjusting said low frequency to provide for optimum root penetration and puddle control for out-of-position welding.

12. A control system according to claim 11, in which said means for adjusting said low frequency includes means for synchronizing said low frequency to the travel speed of the welding arc head relative to the work to thereby maintain a constant spacing between successive melt pulse welds along the direction of travel.

13. The method of claim 5, including the steps of synchronizing said low frequency and pulse width to the position of a cross seam torch oscillator to provide for puddle control as a function of oscillator position.

14. The method of claim 1, including the additional step of pulsing the modulator control signal at a low frequency relative to said given frequency between values corresponding to peak and base values to thereby alternately melt and chill the work, which low frequency and pulse width are adjustable to provide optimum root penetration and/or puddle control especially for said out-of-position welding.

15. The method of claim 14, including the step of synchronizing said low frequency and travel speed of the welding arc relative to the work to provide for constant spacing between successive melt pulse welds along the direction of travel.

16. The method of claim 14, including the step of synchronizing said low frequency and pulse width to the position of a cross seam torch oscillator to provide for puddle control as a function of oscillator position.

17. A control system according to claim 11, in which said means for adjusting said low frequency means includes means for synchronizing said low frequency with the position of a torch cross seam oscillator to provide puddle control as a function of oscillator position.

18. A method for maximizing weld arc stability, puddle control and deposition rate on a work especially in but not limited to out-of-position welding for a given power level and given feed wire electrode material of given diameter, including the steps of:
(a) passing power from a constant current rapid response power supply to the feed wire electrode;
(b) providing a current feedback signal corresponding to the value of the current at the welding arc;
(c) providing a voltage feedback signal corresponding to the value of the voltage at the welding arc;
(d) providing a current reference control signal at a given frequency and given amplitude to modulate the power to provide a current varying between a relatively high output current of the power supply and relatively low output current;
(e) providing a pulse width modulator control signal corresponding to the amplified difference between said voltage feedback signal and a voltage programmed signal;
(f) controlling the pulse width of said current reference control signal with said pulse width modulator control signal to provide a constant voltage control mode of the power supply; and
(g) maintaining the rate of feed of said feed wire material constant.

* * * * *